United States Patent

[11] 3,590,456

| [72] | Inventor | Thomas R. Seaman<br>Baldock, England |
|---|---|---|
| [21] | Appl. No. | 831,802 |
| [22] | Filed | Apr. 2, 1969<br>Division of Ser. No. 678,800, Oct. 30, 1967,<br>Pat. No. 3,469,467. |
| [45] | Patented | July 6, 1971 |
| [73] | Assignee | Borg-Warner Corporation<br>Chicago, Ill. |

[54] METHOD OF MAKING A COMPOSITE DRIVE WHEEL
1 Claim, 3 Drawing Figs.

[52] U.S. Cl............................................. 29/159.2,
74/243, 74/439
[51] Int. Cl..................................................... B21d53/28,
B21h 5/00, B21k 1/30, B23p 15/14, B29d 15/00
[50] Field of Search............................................ 29/159,
159.2; 74/243, 439, 443, 445, 446, 447, 448, 449,
460

[56] References Cited
UNITED STATES PATENTS

| 1,393,886 | 10/1921 | Doty............................ | 74/460 |
| 2,720,119 | 10/1955 | Sherman....................... | 74/460 |
| 2,976,741 | 3/1961 | Martin........................... | 29/159.2 X |
| 3,199,364 | 8/1965 | Dew............................. | 74/460 |
| 3,272,027 | 9/1966 | Wayman...................... | 74/243 |

FOREIGN PATENTS

| 539,809 | 9/1941 | Great Britain................ | 74/243 |

Primary Examiner—John F. Campbell
Assistant Examiner—Victor A. Di Palma
Attorneys—Donald W. Banner, Lyles S. Motley, C. G. Stallings and William S. McCurry ABSTRACT: A composite drive wheel device is disclosed herein to provide an illustration of this invention. This wheel provides a stamped circular plate having a complemental peripheral tooth root ribbon secured to said teeth with a plastic toothed rim which may be molded over the ribbon tooth roots.

PATENTED JUL 6 1971

3,590,456

INVENTOR
THOMAS R. SEAMAN

BY Evans D Roberts

ATTORNEY

METHOD OF MAKING A COMPOSITE DRIVE WHEEL

SUMMARY OF THE INVENTION

The present application is a divisional application of Ser. No. 678,800 filed Oct. 30, 1967, now U.S. Pat. No. 3,469,467 and entitled "Composite Drive Wheel."

This invention relates to a composite drive wheel device wherein a drive wheel plate is provided with a toothed periphery and a corrugated tooth root ribbon which is substantially complementary with respect to the plate teeth and is positioned on the peripheral plate teeth to provide tooth roots. A toothed plastic rim may be molded over the tooth roots with the teeth thereof in respective complemental relationship with the tooth roots.

Figure 1:
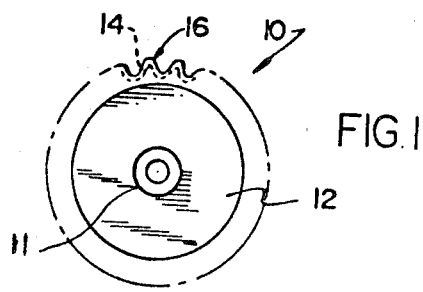
Figure 2:
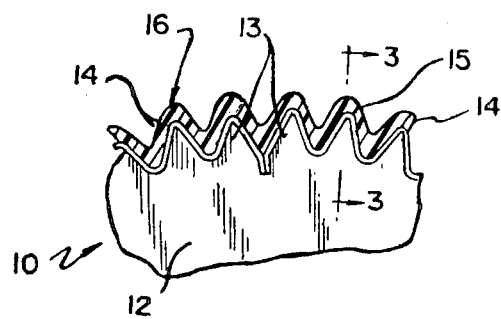
Figure 3:
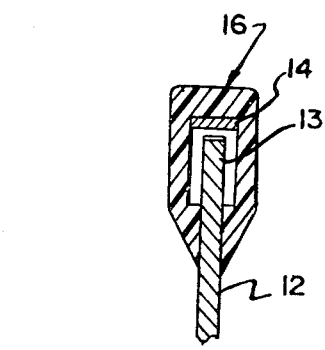

Other advantages and novel aspects of the invention will become apparent upon the following detailed description, in conjunction with the accompanying drawing wherein:

FIG. 1 is a general illustrative representation of the composite drive wheel device of this invention showing a stamped plate having peripheral teeth and a corrugated tooth ribbon secured thereto with the plastic toothed rim molded thereover;

FIG. 2 is a partial axial view of the composite drive wheel of this invention showing the details of the tooth periphery and complementary tooth root ribbon secured thereto within the plastic toothed rim; and FIG. 3 is a partial sectional view of the composite drive wheel of this invention taken along line 3-3 of FIG. 2 showing the axial position of the corrugated tooth ribbon with respect to the stamped wheel plate.

A composite drive wheel generally designated by the numeral 10 is shown for the purpose of illustrating and describing this invention. The wheel 10 thus shown includes generally, among other things, a hub 11, a stamped plate body 12, peripheral tooth roots 13, a tooth root ribbon 14 complementally secured to the plate teeth 13 and a plastic tooth rim 15 which may be molded over the ribbon 14. The hub 11 is secured to the stamped plate body 12, and is adapted with an aperture to drivingly receive a drive or driven shaft. The plastic toothed rim 15 is molded over the tooth roots formed by the ribbon 14, as well as over the teeth 13 of the plate 12. The rim 15 is also provided with teeth 16 which are respectively substantially complemental with respect to the teeth of the tooth root ribbon 14.

Another embodiment of this invention is provided by a composite sprocket having the tooth root ribbon 14 secured over the tooth roots 13 of the body 12 without the plastic rim 15. It should be noted that a sprocket of this type would be a composite structure with sufficient tooth engaging surface to provide an efficient sprocket.

It is to be understood that the invention is not to be limited to the specific constructions and arrangements shown and described, as it will be understood to those skilled in the art that certain minor changes may be made without departing from the principles of the invention.

What I claim is:

1. A method of making a composite drive wheel device comprising the steps of stamping a wheel plate body with a toothed periphery, forming a corrugated tooth root ribbon having substantially the same configuration as the toothed periphery of the plate, securing said tooth root ribbon on the tooth periphery of said plate with the corrugations thereof in complemental engagement with the teeth of the plate, and molding a plastic toothed rim over and around the tooth roots and the plate teeth with the teeth thereof respectively, complementally positioned over said tooth roots.